Aug. 2, 1949.　　　　　C. TIETZMANN　　　　2,478,064
FLUID OPERATED MOTOR AND VALVE
OPERATING MECHANISM THEREFOR
Filed Nov. 29, 1945　　　　　　　　　　　　4 Sheets-Sheet 1
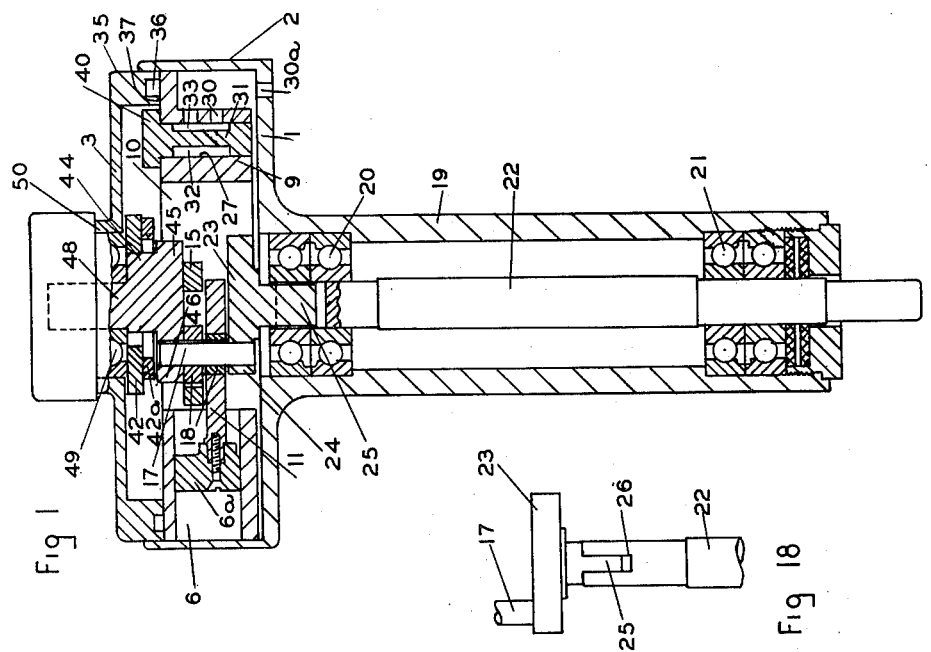
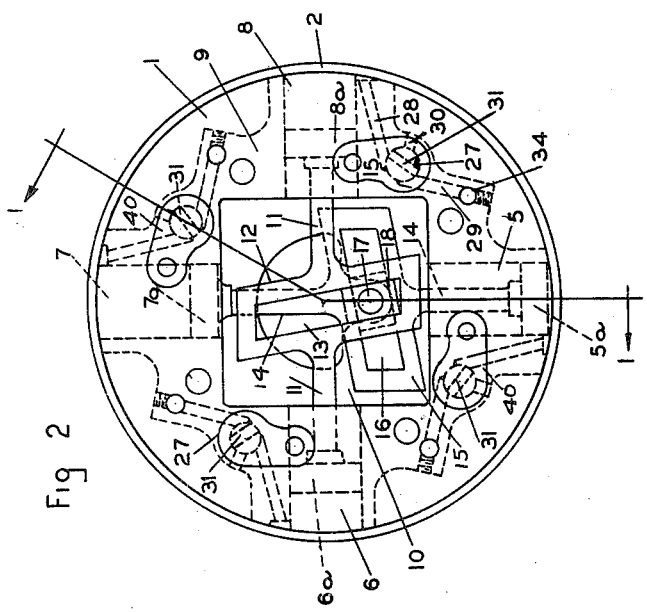
INVENTOR.
CHARLES TIETZMANN
BY
Edward H. Reed
Attorney Aug. 2, 1949.   C. TIETZMANN   2,478,064
FLUID OPERATED MOTOR AND VALVE
OPERATING MECHANISM THEREFOR
Filed Nov. 29, 1945   4 Sheets-Sheet 2
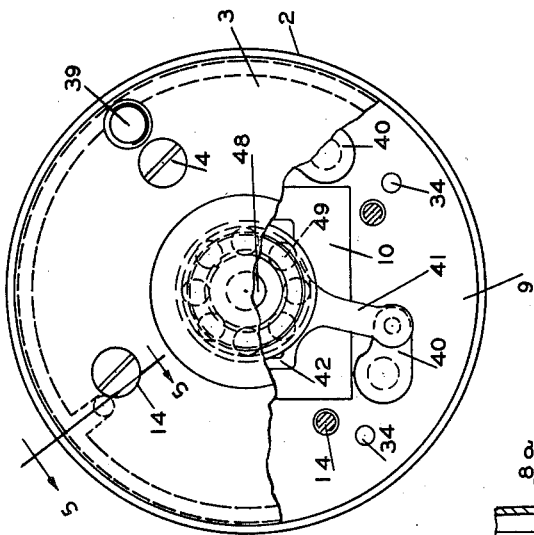
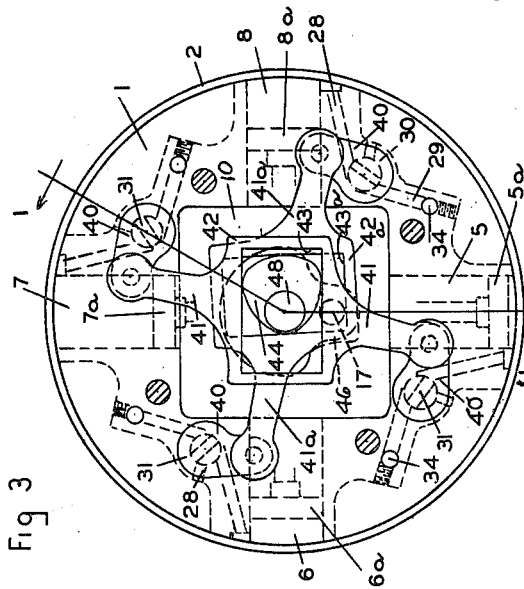
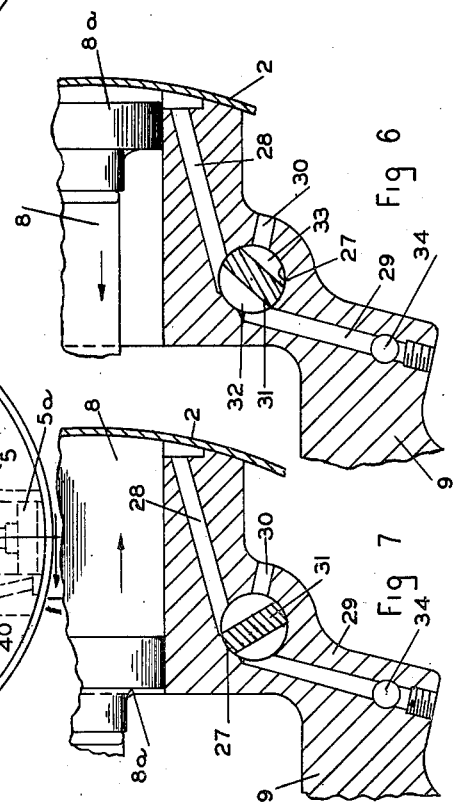
INVENTOR.
CHARLES TIETZMANN

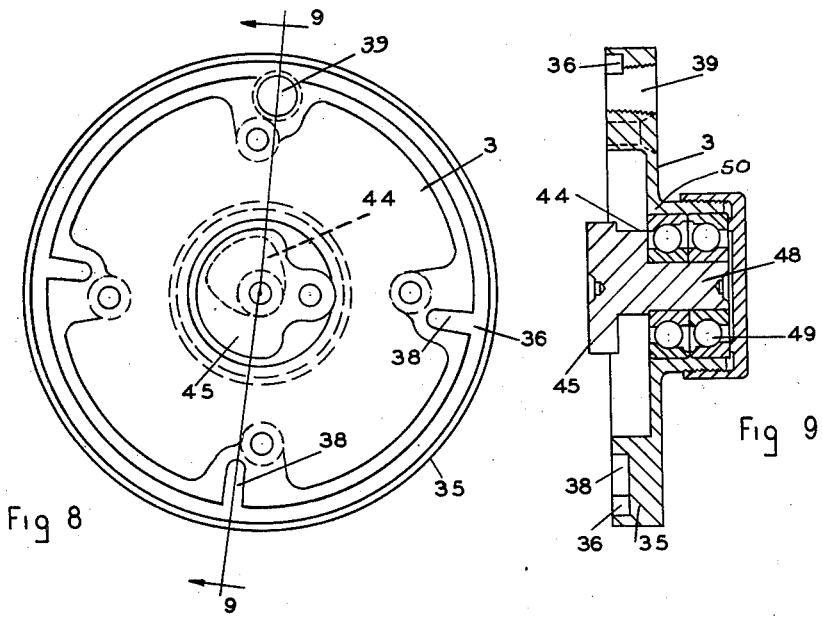
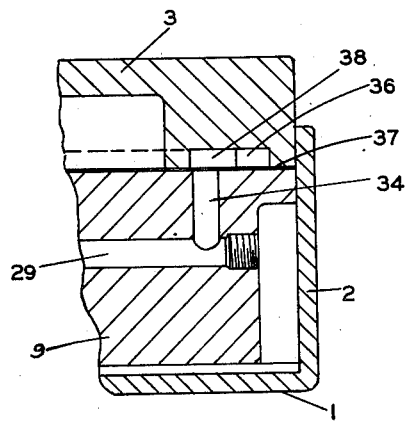

Aug. 2, 1949.                    C. TIETZMANN                    2,478,064
                      FLUID OPERATED MOTOR AND VALVE
                        OPERATING MECHANISM THEREFOR
Filed Nov. 29, 1945                                         4 Sheets-Sheet 4
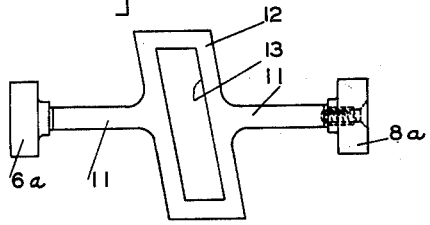
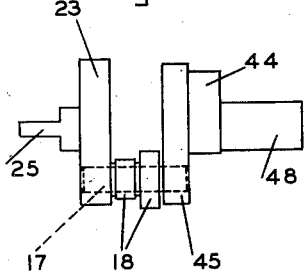
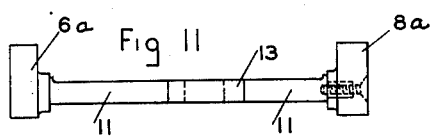
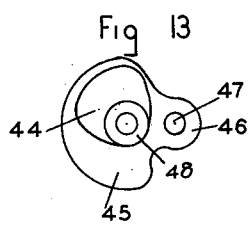
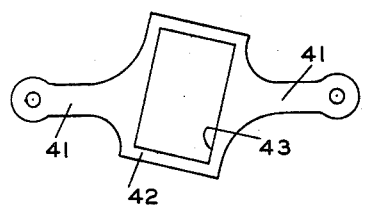
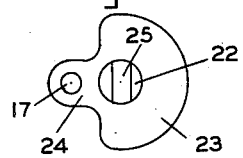
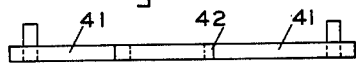
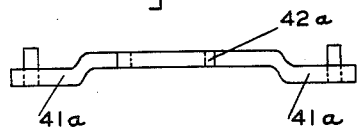
INVENTOR.
CHARLES TIETZMANN
BY
Attorney Patented Aug. 2, 1949

2,478,064

UNITED STATES PATENT OFFICE 2,478,064

FLUID OPERATED MOTOR AND VALVE OPERATING MECHANISM THEREFOR

Charles Tietzmann, Dayton, Ohio

Application November 29, 1945, Serial No. 631,512

1 Claim. (Cl. 121—120)

This invention relates to a fluid operated motor, and more particularly to an air operated motor, and one object of the invention is to provide a simple efficient motor which can be produced at a low cost.

A further object of the invention is to provide a motor which is of compact construction and will operate efficiently when made in small sizes.

A further object of the invention is to provide such a motor in which the connection between the pistons and the power shaft includes a Scotch yoke.

A further object of the invention is to provide such a motor in which the power impulses will overlap in such a manner as to provide a smooth continuous operation.

A further object of the invention is to provide such a motor having simple positively operated means for controlling the flow of fluid to and from the cylinders.

Other objects of the invention may appear as the motor is described in detail.

In the accompanying drawings, Fig. 1 is a section taken centrally through the motor substantially on line 1—1 of Figs. 2 and 3; Fig. 2 is a plan view of the motor with the top of the casing and the valve actuating devices removed; Fig. 3 is a similar view with the valve actuating devices in place; Fig. 4 is a top plan view of the motor with the top wall of the casing partly broken away; Fig. 5 is a sectional detail view on line 5—5 of Fig. 4 showing the means for connecting the valves with a source of fluid under pressure; Fig. 6 is a sectional detail view taken through one of the two-way valves which control the flow of fluid to and from the cylinders, showing the cylinder connected with the supply passage; Fig. 7 is a similar view showing the cylinder connected with the exhaust passage; Fig. 8 is a bottom plan view of the top wall of the casing showing the cam mounted therein; Fig. 9 is a section taken on the line 9—9 of Fig. 8; Fig. 10 is a plan view of one of the piston connecting members; Fig. 11 is an edge view of the member shown in Fig. 10; Fig. 12 is a detail view showing the connection between the wrist pin and the cam; Fig. 13 is a detail view of the cam and its supporting member; Fig. 14 is a detail view of the upper valve actuating member; Fig. 15 is an edge view of the latter; Fig. 16 is an edge view of the lower valve actuating member; Fig. 17 is a bottom plan view of the wrist pin supporting member; and Fig. 18 is a detail view of a part of the shaft and the wrist pin.

In these drawings I have illustrated one embodiment of the invention and have shown the same as an air operated motor and will so describe it, but it is obvious that by utilizing the power output shaft as a power input shaft the device will function as a pump or compressor. It is also to be understood that the apparatus as a whole, as well as the several parts thereof, may take various forms and may be assembled in various ways without departing from the spirit of the invention.

In the illustrated embodiment of the invention the motor comprises a casing including a bottom wall 1, a circumferential wall 2, and a top wall 3, the top wall being rigidly connected with the bottom wall by screws 4. The casing is preferably in the form of a short cylinder and is here shown with its axis in a vertical position but it is to be understood that the motor will operate in any position in which it may be supported. Mounted within the casing and arranged radially thereto are four cylinders 5, 6, 7, and 8. The cylinders are arranged in pairs with the cylinders of each pair in opposed relation one to the other, and the two pairs of cylinders are here shown as arranged at right angles one to the other. The cylinders may be of any suitable character and may be supported within the casing in any desired manner but in the present instance a body or cylinder block 9 is mounted in the casing with the outer ends of the cylinders in contact with and closed by the circumferential wall 2 of the casing, the inner ends of the cylinders being open to the atmosphere. The cylinder block is provided with a central opening 10, here shown as approximately square, and in the arrangement shown the cylinders open into said central opening. Mounted in the respective cylinders are pistons 5a, 6a, 7a, and 8a. The pistons of each pair of cylinders are rigidly connected one with the other for movement in unison. In the present instance, the connections are in the nature of a Scotch yoke and the pistons 6a and 8a are rigidly secured to an actuating member comprising alined arms 11 connected one with the other by a part 12 extending transversely to the arms and provided with a guideway, such as a slot 13, which is preferably rectangular in form and extends for the major portion of the length of the transverse part 12. Preferably the slot is arranged at an acute angle to the arms 11. The pistons 5a and 7a are rigidly connected with the arms 14 of a similar connecting member, the transverse portion 15 of which is provided with a slot 16 similar to the slot 13. The two connecting members are supported in parallel planes one above the other and the arrangement is such that the slots 13 and 16 will be in overlapping relation one to the other in all relative positions of the connecting members.

A stud 17 extends through the guideways 13 and 16 and is so mounted that it will be caused to revolve about a fixed axis by the relative movements of the connecting members. Preferably a bearing member, such as a slide block 18, is mounted in each guideway, the two bearing members being provided with alined openings to receive the stud, thus enabling the relative movement of the several parts with a minimum of friction.

The stud 17 may be mounted in any suitable manner and is connected with a power shaft so as to transmit power from the piston to the shaft. In the present arrangement the bottom wall 1 of the casing is provided with a tubular axial extension 19 provided adjacent its respective ends with bearings 20 and 21 in which a power shaft 22 is mounted. The power shaft extends beyond the bearing 20 into the opening 19 in the cylinder block and is provided therein with a plate-like member 23 having a radial arm 24 in which the stud 17 is rigidly mounted, so that the stud constitutes a wrist pin carried by the power shaft. In the present instance, the shaft 22 is formed in two parts connecting one with the other by a tongue 25 and slot 26, to facilitate assembly.

Fluid under pressure is admitted to the outer ends of the several cylinders successively and in such timed relation to the movements of the pistons that fluid is admitted to the outer end of each cylinder before the power stroke of the next proceeding piston has been completed, thus providing overlapping power impulses and causing the piston connecting members to move simultaneously in different directions and to thereby impart to the wrist pin and the shaft a continuous movement which is smooth and substantially free from vibration.

The fluid may be admitted to and exhausted from the outer ends of the respective cylinders in any suitable manner and preferably each cylinder is provided with individual means for controlling the flow of the fluid to and from the same. It is also desirable that the admission and exhaust of the fluid to and from the cylinder shall be controlled by a single valve unit, such as a two-way valve. In the illustrated construction the cylinder block 9 is provided adjacent each cylinder with a bore 27 constituting a valve chamber, and with a passage 28 connecting the valve chamber with the outer end of the corresponding cylinder, a fluid supply passage 29 and an exhaust passage 30. Mounted in the valve chamber is a rotatable valve member 31 provided with two ports, 32 and 33, which in the present instance are formed by cutting away the opposite side portions of a cylindrical valve member. The parts are so arranged that when the valve is in one position, as shown in Fig. 6, the supply passage 29 will be connected through the passage 28 with the cylinder and when the valve is in its other position, as shown in Fig. 7, the cylinder will be connected through the passage 28 with the exhaust passage 30. The supply passage 29 may be connected with a source of fluid under pressure, preferably air, in various ways but preferably a vertical passage 34 extends from the supply passage 29 through the upper surface of the cylinder block and is adapted to communicate with a fluid channel in the top wall of the casing. In the present construction the top wall 3 of the casing is provided with a circumferential portion 35 which is provided in its lower edge with a circumferential groove 36, the lower side of which is closed by the top surface of the cylinder block and is sealed by a gasket 37. The channel 36 is provided with radial extensions 38 which overlap the upper ends of the respective vertical passages 34 so as to connect each of these passages with the fluid channel 36 (see Fig. 5). The channel 36 may be connected with the source of fluid supply in any suitable manner and as shown in Figs. 8 and 9 the top wall 3 of the casing is provided with an opening 39 communicating with the channel 36 and adapted to receive a fitting, not shown, by means of which a fluid supply conduit may be connected therewith. The air discharged through the exhaust passage 30 may be permitted to escape to the atmosphere in any suitable manner. In the present instance the lower portion of the cylinder block is cut away between adjacent cylinders and the exhaust passage 30 opens into the casing and the air escapes from the latter through openings 30a in the bottom wall of the casing.

The movements of the several valve members to positions to admit fluid to and exhaust the same from the respective cylinders are controlled in accordance with the movements of the pistons so as to properly time the admission of fluid to each cylinder. Preferably the valves are controlled by the movement of the wrist pin 17. In the illustrated arrangement a crank arm 40 is rigidly secured to and preferably formed integral with each valve member 31 and is arranged above and close to the upper surface of the cylinder block. The crank arms for the valves of each pair of cylinders are connected one with the other for movement in unison, the valve members being so arranged that the movement of the connecting means in one direction will actuate the two valves to cause fluid to be admitted to one cylinder and to be exhausted from the other cylinder. As here shown the connecting means for the valves for cylinders 5 and 7 comprises an actuating member including arms 41 pivotally connected at their outer ends with the respective crank arms 40 and rigidly connected one with the other by a plate-like member 42 having within the same an opening 43, preferably rectangular in contour. The valves for cylinders 6 and 8 are connected by a similar actuating device having arms 41a connected with the valves and connected one with the other by a plate 42a having an opening 43a. The arms 41a are vertically offset as shown in Fig. 16 to enable the part 42a thereof to be supported beneath and close to the part 42 of the upper actuating member. The openings of the two actuating members are in overlapping relation one to the other in all positions of the actuating members and a cam 44 is arranged within the openings 43 and 43a and is of such thickness that it will engage the edge walls of both openings. The cam is mounted for rotation about a fixed axis and is shown as a part of a cam unit including a base portion 45 preferably integral with the cam having a radially extending arm 46 provided with an opening 47 into which the wrist pin 17 extends. Extending upwardly from the cam is a trunnion member 48 which is journalled in a bearing 49 in a tubular extension 50 of the top wall 3 of the casing, this trunnion also being preferably integral with the cam and the bearing being in axial alinement with the bearing 20 for the power shaft. Thus as the wrist pin is revolved about the axis of the shaft 22 and of the cam the cam is caused to rotate therewith and to act upon the valve actuating members to impart movement to the valves, the cam being so shaped and arranged that the movements of the valves will be accurately timed with relation to the movements of the pistons. The cam 44 is so shaped that when a given valve has been moved to fluid admitting position, or to exhaust position, the arcuate outer end of the cam will engage the straight edge of the actuating member at one side of the opening and move over that edge without imparting further movement to the valve until said arcuate portion has moved out of engagement with said edge, thus retaining the valve in its fully open position during the major portion of the stroke of the piston in the cylinder with which that valve is connected.

While I have shown and described one embodiment of my invention I wish it to be understood that I do not desire to be limited to the details thereof as various modifications may occur to a person skilled in the art.

Having now fully described my invention what I claim as new and desire to secure by Letters Patent, is:

A fluid operated motor comprising a cylinder block having a central opening and also having within the same two pairs of opposed cylinders the inner ends of which are in open communication with said central opening, pistons in the respective cylinders, members connecting the pistons in the respective pairs of cylinders, each member having within said central opening a part provided with a slot extending transversely to the line of movement of the pistons with which said member is connected, a shaft rotatable about an axis extending through the opening in said cylinder block, a stud rigidly secured to said shaft, spaced from the axis thereof and extending through the slots in both of said members, whereby the relative movements of said members will impart rotation to said shaft, valve chambers formed in said cylinder block and connected with the outer ends of the respective cylinders, each valve chamber having a passage adapted to be connected with a source of fluid supply, and an exhaust passage, a rotatable valve member in each valve chamber to control the flow of fluid to and from the cylinder with which it is connected, a crank arm on each valve member, rigid actuating members pivotally connected with the crank arms of the valve members for the respective pairs of cylinders, and having openings through which said stud extends, and a cam connected with said stud and arranged in the openings in said valve actuating members.

CHARLES TIETZMANN.

REFERENCES CITED

The following references are of record in the file of this patent:

UNITED STATES PATENTS

| Number | Name | Date |
| --- | --- | --- |
| 399,593 | Worth | Mar. 12, 1889 |
| 434,143 | Crosby | Aug. 12, 1890 |
| 492,267 | Bruce | Feb. 21, 1893 |
| 511,868 | Tubbs | Jan. 2, 1894 |
| 544,298 | Halsey | Aug. 13, 1895 |
| 1,951,721 | Brennan | Mar. 20, 1934 |
| 2,375,490 | Overly | May 8, 1945 |

FOREIGN PATENTS

| Number | Country | Date |
| --- | --- | --- |
| 112,767 | Great Britain | Oct. 24, 1918 |